(12) United States Patent
Ravella et al.

(10) Patent No.: US 11,565,699 B1
(45) Date of Patent: Jan. 31, 2023

(54) METHODS AND APPARATUS FOR AUTOMATED SPEED SELECTION AND RETARDER APPLICATION IN DOWNHILL DRIVING OF AN AUTONOMOUS TRACTOR TRAILER

(71) Applicant: PlusAI, Inc., Cupertino, CA (US)

(72) Inventors: Siva Bhargav Ravella, Santa Clara, CA (US); Xiaoyu Huang, San Jose, CA (US); Amit Kumar, Sunnyvale, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/710,868

(22) Filed: Mar. 31, 2022

(51) Int. Cl.
*B60W 30/18* (2012.01)
*B60W 10/18* (2012.01)
(Continued)

(52) U.S. Cl.
CPC ...... *B60W 30/18118* (2013.01); *B60W 10/10* (2013.01); *B60W 10/18* (2013.01);
(Continued)

(58) Field of Classification Search
CPC .......... B60W 30/18118; B60W 10/10; B60W 10/18; B60W 30/18127; B60W 60/001; B60W 2420/42; B60W 2520/10; B60W 2530/10; B60W 2552/15; B60W 2555/20; B60W 2556/10; B60W 2556/40; B60W 2710/10; B60W 2710/18; B60W 2720/10; B60W 30/181136; B60W 30/18172; B60W 10/101; B60W 10/108; B60W 10/184; B60W 10/188; B60W 10/196; B60W 30/18136; B60W 60/0011;
(Continued)

(56) References Cited

U.S. PATENT DOCUMENTS

2005/0096183 A1* 5/2005 Watanabe ................. B60T 7/12
477/182
2009/0254250 A1* 10/2009 Koo ................ B60W 30/18145
701/37
(Continued)

FOREIGN PATENT DOCUMENTS

CN 108357486 A * 8/2018 ............... B60T 7/12
JP 2001078305 A * 3/2001
(Continued)

*Primary Examiner* — Babar Sarwar
(74) *Attorney, Agent, or Firm* — Sheppard Mullin Richter & Hampton LLP (57) ABSTRACT

A method includes detecting, via a processor of an autonomous vehicle, an upcoming downhill road segment of a route on which the autonomous vehicle is currently travelling. The detection is based on map data, camera data, and/or inertial measurement unit (IMU) data. In response to detecting the upcoming downhill road segment, a descent plan is generated for the autonomous vehicle. The descent plan includes a speed profile and a brake usage plan. The brake usage plan specifies a non-zero amount of retarder usage and an amount of foundation brake usage for a predefined time period. The method also includes autonomously controlling the autonomous vehicle, based on the descent plan, while the autonomous vehicle descends the downhill road segment.

20 Claims, 7 Drawing Sheets

(51) Int. Cl.
*B60W 10/10* (2012.01)
*B60W 60/00* (2020.01)

(52) U.S. Cl.
CPC .... *B60W 30/18127* (2013.01); *B60W 60/001* (2020.02); *B60W 2420/42* (2013.01); *B60W 2520/10* (2013.01); *B60W 2530/10* (2013.01); *B60W 2552/15* (2020.02); *B60W 2555/20* (2020.02); *B60W 2556/10* (2020.02); *B60W 2556/40* (2020.02); *B60W 2710/10* (2013.01); *B60W 2710/18* (2013.01); *B60W 2720/10* (2013.01)

(58) Field of Classification Search
CPC ....... B60W 60/0013; B60W 2420/105; B60W 2420/125; B60W 2420/12; B60W 2420/26; B60W 2552/20; B60W 2552/25; B60W 2555/40; B60W 2555/60; B60W 2710/182
See application file for complete search history.

(56) References Cited

U.S. PATENT DOCUMENTS

| | | | | |
|---|---|---|---|---|
| 2012/0142491 A1* | 6/2012 | Gwon | .................. | B60W 10/06 477/94 |
| 2016/0082967 A1* | 3/2016 | Kam | .................... | B60W 10/02 701/70 |
| 2016/0082970 A1* | 3/2016 | Jeon | .................... | F16H 61/0213 477/118 |
| 2016/0325749 A1* | 11/2016 | Lee | ...................... | F02N 11/0837 |
| 2017/0166210 A1* | 6/2017 | Kim | ................ | B60W 30/18027 |
| 2017/0313299 A1* | 11/2017 | Yun | ...................... | B60W 20/15 |
| 2018/0065638 A1* | 3/2018 | Kawahara | ........... | B60W 10/184 |
| 2018/0105158 A1* | 4/2018 | Namuduri | ........... | B60W 40/076 |
| 2018/0170347 A1* | 6/2018 | Kim | ................ | B60W 30/18127 |
| 2019/0003839 A1* | 1/2019 | Hu | ........................ | G05D 1/0088 |
| 2019/0100214 A1* | 4/2019 | Kato | .................... | B60W 10/30 |
| 2019/0176811 A1* | 6/2019 | Cho | ................... | B60G 17/0195 |
| 2019/0217854 A1* | 7/2019 | Park | .................... | B60W 30/045 |
| 2019/0375407 A1* | 12/2019 | Maleki | .................. | B60W 30/14 |
| 2021/0094546 A1* | 4/2021 | Bonaccorso | .... | B60W 30/18109 |
| 2021/0171030 A1* | 6/2021 | Lee | .......................... | H04W 4/40 |
| 2021/0179064 A1* | 6/2021 | Son | ........................ | B60K 6/48 |
| 2021/0301920 A1* | 9/2021 | Noguchi | ................ | F16H 61/04 |
| 2021/0380121 A1* | 12/2021 | Oishi | .................. | B60W 40/107 |
| 2022/0009487 A1* | 1/2022 | Belle | .................. | B60W 30/143 |
| 2022/0017089 A1* | 1/2022 | Aikawa | ............. | B60K 31/0008 |
| 2022/0169250 A1* | 6/2022 | Yoshida | ............. | B60W 30/143 |

FOREIGN PATENT DOCUMENTS

| | | | | |
|---|---|---|---|---|
| JP | 3557890 B2 | * | 8/2004 | |
| JP | 2006298178 A | * | 11/2006 | ................ B60T 8/00 |
| WO | WO-2020035128 A1 | * | 2/2020 | |

* cited by examiner

METHODS AND APPARATUS FOR AUTOMATED SPEED SELECTION AND RETARDER APPLICATION IN DOWNHILL DRIVING OF AN AUTONOMOUS TRACTOR TRAILER

FIELD

The present disclosure relates to autonomous vehicle control, and more specifically, to dynamic adjustments to operational parameters of an autonomous vehicle.

BACKGROUND

Friction-based braking systems of semi-trucks use compressed air, as contrasted with standard passenger vehicles, whose friction-based braking systems use hydraulic fluid. The friction-based braking systems of semi-trucks are often referred to as "foundation brakes." In addition to friction-based braking systems, the diesel engines of semi-trucks also typically include a compression release engine brake (or "jake brake") for braking.

SUMMARY

In some embodiments, a method includes detecting, via a processor of an autonomous vehicle (such as an autonomous semi-truck), an upcoming downhill road segment of a route on which the autonomous vehicle is currently travelling. The detection is based on map data, camera data, and/or inertial measurement unit (IMU) data. In response to detecting the upcoming downhill road segment, a descent plan is generated for the autonomous vehicle. The descent plan includes a speed profile and a brake usage plan. The brake usage plan specifies a non-zero amount of retarder usage and an amount of foundation brake usage for a predefined time period. The method also includes autonomously controlling the autonomous vehicle, based on the descent plan, when the autonomous vehicle descends the downhill road segment.

In some embodiments, a method includes detecting, via a processor of an autonomous vehicle, an upcoming downhill road segment of a route on which the autonomous vehicle is currently travelling. The detecting can be based on at least one of map data, camera data, or inertial measurement unit (IMU) data, or any combination thereof. The method also includes generating, via the processor of the autonomous vehicle and in response to detecting the upcoming downhill road segment, descent settings for the autonomous vehicle. The descent settings can include at least one retarder setting, at least one gear setting, and at least one brake setting, or any sub-combination thereof. The at least one retarder setting can represent a non-zero amount of braking power. The method also includes autonomously controlling the autonomous vehicle, via the processor of the autonomous vehicle and based on the descent settings, when the autonomous vehicle descends the downhill road segment.

In some embodiments, a non-transitory, processor-readable medium stores processor-executable instructions that, when executed by a processor, cause the processor to detect, at an autonomous vehicle, an upcoming downhill road segment of a route on which the autonomous vehicle is currently travelling. The non-transitory, processor-readable medium also stores processor-executable instructions that, when executed by a processor, cause the processor to generate, at the autonomous vehicle and in response to detecting the upcoming downhill road segment, descent settings for the autonomous vehicle. The descent settings can include at least one speed setting and/or at least one brake setting. The non-transitory, processor-readable medium also stores processor-executable instructions that, when executed by a processor, cause the processor to generate a suggested manual retarder setting, and to autonomously control the autonomous vehicle, via the processor of the autonomous vehicle and based on the descent settings and the suggested manual retarder setting, when the autonomous vehicle descends the downhill road segment, the autonomous control not including autonomous control of the retarder.

DETAILED DESCRIPTION

When a vehicle traverses a sloped, hilly, or "graded," surface in a downward direction, the steeper the grade, the longer the graded surface, and/or the heavier the load, the lower the gears that may be desired (or recommended) to ensure a safe descent. In addition, it can be desirable that the vehicle travel at a sufficiently low speed to prevent the brakes from becoming too hot because overheated brakes can "fade." Brake fade is a condition in which braking system components no longer generate the friction needed to stop the vehicle within a desired (e.g., safe) amount of time or distance. In other words, when brake fade occurs, the brakes are less effective, or no longer effective, at slowing down or stopping the vehicle. In addition to (and, in some situations, instead of) braking, truck operators often apply retarding devices (i.e., "retarders") and select gearing to control speed during downhill conditions. Retarders are devices or systems used to augment or replace the function(s) of primary friction-based braking systems. Retarders can include, for example, engine brakes (e.g., jake brakes, exhaust brakes), hydraulic retarders, and electric retarders.

Known approaches to reducing speed during downhill vehicle travel often fail to proactively reduce speed based on a predictive "horizon" (e.g., a predicted change in grade or slope of a road) before reaching a change in grade or slope of a road. This can be dangerous because, depending on a primary brake's prior usage (e.g., where frequent braking occurred due to "cut-ins," where other vehicles in adjacent lanes change lane and move closely in front of the vehicle), the foundation brakes may be prone to failure on a downhill slope. Moreover, known approaches also often fail to effectively implement brake pulsating strategies to minimize brake fade, in the event that the brakes must be used. Moreover, although retarder settings have previously been manually used by truck drivers, retarder settings have not previously been implemented in an autonomous vehicle while operating in an autonomous mode.

Systems and methods of the present disclosure, according to some embodiments, address the foregoing challenges by facilitating automatic control of downhill speed, for example by automatically controlling gear shifting and retarder brake usage over time for an autonomous vehicle (e.g., an autonomous semi-truck) prior to and/or during the autonomous vehicle's descent of a downhill road segment. The detection of an upcoming downhill road segment can be based on map data, camera data, and/or IMU data, some or all of which may be generated at the autonomous vehicle.

In some embodiments, speed of an autonomous vehicle is automatically reduced (e.g., according to a speed profile), a brake usage plan of the autonomous vehicle automatically begins executing (e.g., specifying a non-zero amount of retarder usage and an amount of foundation brake usage, optionally for a predefined time period that can vary for each downhill), and/or a gear usage plan of the autonomous vehicle automatically begins executing (e.g., specifying one or more down-shift events) prior to the autonomous vehicle arriving at the downhill road segment. In such implementations, the speed may be further modified (e.g., with dynamic changes that may be based on real-time sensor data), the brake usage plan may continue to be executed (e.g., with dynamic changes that may be based on real-time sensor data), and/or the gear usage plan may continue to be executed (e.g., with dynamic changes that may be based on real-time sensor data) as the autonomous vehicle descends/traverses the downhill road segment.

In some embodiments, automatic control of downhill speed is performed, for an autonomous vehicle, using one or more process controls. Model predictive control (MPC) is a type of process control that is used to control a process while satisfying a set of constraints. Model predictive controllers can rely on dynamic models of the process, such as linear empirical models obtained by system identification (i.e., using statistical methods to construct mathematical models of dynamical systems based on measured data such as sensor data). When MPC is used, a current timeslot (or "finite time-horizon") may be optimized, and future timeslots can subsequently be separately optimized. MPC can also be used to predict/anticipate future events and take control actions accordingly. MPC can be implemented as a digital control and/or using specially designed analog circuitry.

In some embodiments, a system for automatically controlling downhill speed of an autonomous vehicle is configured/programmed to detect an upcoming or current steep downhill road segment. In response to detecting the upcoming or current steep downhill road segment, the system automatically switches from a current mode of the autonomous vehicle to a "minimize inertia drive mode," and selects "speed settings" (e.g., including an appropriate speed of travel) for the autonomous vehicle, and/or a desired braking strategy, based on one or more of: cargo weight, length of a graded segment of the downhill road segment, average length of a collection of graded segments of the downhill road segment, steepness of the graded segment or collection of graded segments of the road segment, one or more detected road conditions, one or more received or detected weather conditions (e.g., wind), one or more known specifications of the vehicle (e.g., tire diameter, gear ratio, number of gears, vehicle dimensions, vehicle shape, type of brakes (e.g., disk, drum), whether or not the autonomous vehicle has an anti-lock brake system (ABS), age of one or more sets of brakes, brake usage history, current brake temperature, historical brake temperatures, etc.), or one or more detected conditions of the vehicle (e.g., detected tire wear, detected brake wear, brake age, detected fuel level, detected brake temperature, etc.).

In some embodiments, a system for automatically controlling downhill speed of an autonomous vehicle includes powertrain models (e.g., engine, transmission, wheel axles) and vehicle dynamics models (e.g., brake, steering, tire) for automatically generating or selecting speed settings and brake settings (e.g., a relative distribution of retarder usage and foundation brake usage) for an upcoming or current downhill road segment. The speed settings and brake settings can collectively be referred to as a "descent plan." The generation or selection of speed settings and brake settings can be performed in response to detecting an upcoming downhill road segment. The detection of an upcoming downhill road segment can be based on any one or combination of: sensor data (e.g., IMU data) generated at the autonomous vehicle, map data stored with the autonomous vehicle, map data stored in a compute device that is remote from the autonomous vehicle, camera data generated at the autonomous vehicle, camera data generated at one or more other autonomous vehicles (e.g., drones, other autonomous vehicles, etc.), one or more notifications received at the autonomous vehicle from another autonomous vehicle and/or from a remote compute device, etc. Although shown and described herein as including speed settings and brake settings, a descent plan can also include one or more of: a lighting plan (e.g., automatically turn on hazard lights for duration of descent of downhill road segment) and/or an evasion plan (i.e., one or more routes that the autonomous vehicle can take in the event of brake failure, based for example on a nearest runaway truck ramp, detecting the presence of other nearby vehicles and their speed, etc.).

The selection of speed settings can be based on, for example, camera data ("camera perception," for example including the detection of speed limits/warnings, road conditions, downhill warning signs, etc.) and on map data. The map data can include, for example, topographical data, which may include indications of elevation, indications of the presence of natural features such as mountains, bodies of water, trees, etc., and/or indications of the presence of man-made features such as signage, buildings, traffic signaling equipment, other vehicles, etc. Map data can include static (e.g., historical) data and/or dynamic data that is being updated in real-time or substantially in real-time. The speed settings can specify one or more of: a maximum speed, a permissible range of speeds, a maximum engine revolutions per minute (RPM), a permissible RPM range, or a speed trajectory (i.e., changes in speed over time). The brake settings can specify one or more of: brake type(s), percentage application of brake for each brake type, timing of application of brake for each brake type, sequencing of braking associated with one or more brake types, retarder settings, retarder type, foundation brake application technique (e.g., cadence braking or constant uniform application), target deceleration rate (e.g., about 5 m/s$^2$). The brake types can include, but are not limited to: foundation brake, retarder, engine brake, exhaust baffle, and a friction plate in the transmission of the autonomous vehicle.

In some embodiments, a system for automatically controlling downhill speed of an autonomous vehicle, in addition to generating or selecting a descent plan, is also configured to generate one or more future speed settings and/or brake settings associated with future travel of the autonomous vehicle after the autonomous vehicle has descended the downhill road segment. The one or more future speed settings and/or brake settings can be generated and/or selected as discussed above with reference to the descent plan.

In some embodiments, a system for automatically controlling downhill speed of an autonomous vehicle is configured to generate and implement a cadence braking strategy (also referred to as "stutter braking"), in which the foundation brakes are alternately applied and removed ("pulsated") according to a predefined schedule to reduce or prevent brake fading, optionally in combination with downshifting and/or the use of a retarder. A desired amount of cadence braking may be higher for steeper grades of downhill road segments, and may be lower for less steep grades of downhill road segments.

As used herein, a "semi-truck" refers to the combination of a tractor (also referred to as a tractor cab or rig) and one or more semi-trailers (e.g., for carrying freight). The tractor may be coupled to the one or more semi-trailers via one or more hitch connections, which provide mechanical, pneumatic and/or electrical coupling between the tractor and the one or more semi-trailers.

As used herein, an "autonomous vehicle" refers to any vehicle (e.g., a ground vehicle such as a car, truck, semi-truck, etc.) having vehicular automation, in that the vehicle is capable of sensing its environment and safely travelling (e.g., along a road) without human input, or with minimal human input. Autonomous vehicles described herein can be configured to wirelessly communicate with one or more remote compute devices, during periods of time when wireless connectivity is available/possible, for a variety of purposes including, but not limited to: receiving third-party data such as weather reports and alerts, receiving global positing system (GPS) data, receiving navigation commands, receiving or transmitting map data, receiving remote sensor data (i.e., data from sensors not disposed within or on the autonomous vehicle, but pertinent to the operations of the autonomous vehicle, such as sensors to detect road moisture, wind and temperature data associated with one or more locations along a route of travel, earthquake detection instruments (e.g., seismometers), etc.), transmitting sensor data generated at the autonomous vehicle, transmitting alerts, etc.

Figure 1A:
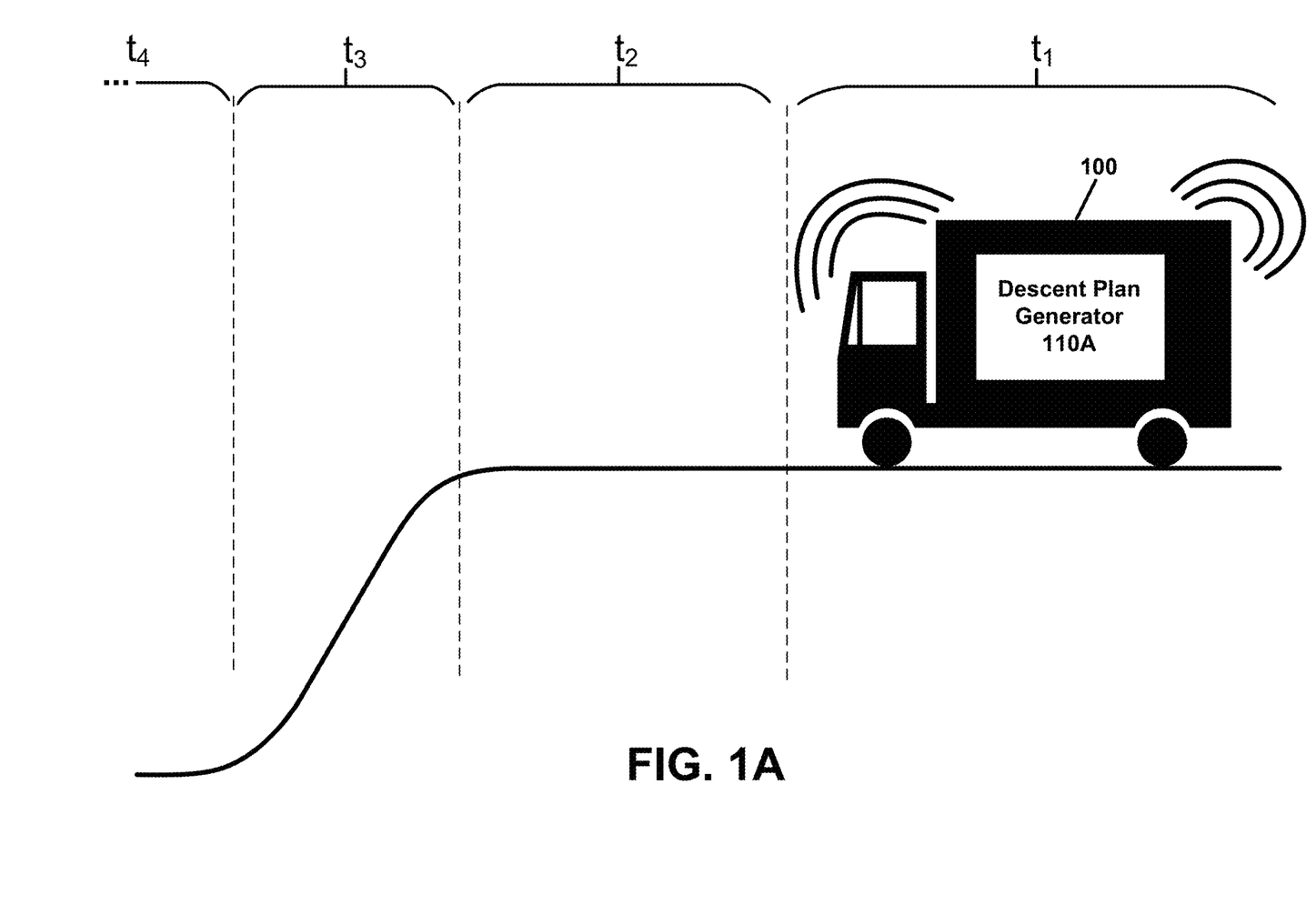
FIG. 1A is a graphical depiction of an implementation of an autonomous vehicle control system, according to some embodiments.

In some embodiments, a system for automatically controlling downhill speed of an autonomous vehicle is configured to generate a descent plan with multiple subsets of control data (i.e., a multi-phase plan for speed and braking). An example implementation of a descent plan is discussed with reference to FIG. 1A. As shown in FIG. 1A, an autonomous vehicle 100 includes a descent plan generator 110A, implemented in hardware and/or software (e.g., as shown and described with reference to FIG. 4B, below), and during time interval $t_1$ is travelling leftward along a flat road segment. Also during time interval $t_1$, the autonomous vehicle 100 detects an upcoming downhill road segment (e.g., based on sensor data generated by sensors onboard the autonomous vehicle) or is otherwise notified of the upcoming downhill road segment (e.g., based on map data). In response to detecting or being notified of the upcoming downhill road segment, the descent plan generator 110A automatically generates a descent plan specifying speed settings and brake settings for a first phase (e.g., corresponding to time interval $t_2$), speed settings and brake settings for a second phase (e.g., corresponding to time interval $t_3$), and speed settings and brake settings for a third phase (e.g., corresponding to time interval $t_4$). In other words, the descent plan generator 110A can automatically generate a descent plan that includes (1) speed settings and brake settings for a time period preceding the autonomous vehicle's future traversal of the downhill road segment (i.e., $t_2$), (2) speed settings and brake settings for a time period coinciding with or overlapping with the autonomous vehicle's future traversal of the downhill road segment (i.e., $t_3$), and (3) speed settings and brake settings for a time period subsequent to the autonomous vehicle's future traversal of the downhill road segment (i.e., $t_4$). The speed settings and brake settings for each of the first, second, and third phases can include one or more (or any combination of) the following: accelerator setting, speed setpoint, set of speed setpoints (e.g., for each of a plurality of locations along the relevant road segment), brake type(s), sequence of speed setpoints, linear speed adjustment, brake setting(s) (e.g., force, position, percentage usage), sequence or pattern of brake usage, sequence or pattern of brake application, rate of deceleration, ratio of brake to retarder usage, retarder setting(s), and sequence or pattern of retarder usage. Example descent plans are shown in Tables 1A and 1B below.

TABLE 1A

Descent Plan (Version 1)

| | $t_2$ | $t_3$ | $t_4$ |
|---|---|---|---|
| Speed Setting | Set max speed to 40 mph | Set max speed to 25 mph | Set max speed to 40 mph |
| Brake Type: Foundation Brake | Apply brake to reduce speed to below 40 mph | Apply brake to reduce speed to below 25 mph | — |
| Brake Type: Retarder | — | 30% | — |
| Gear Setting | Downshift by one gear | No change | Upshift by one gear |

TABLE 1B

Descent Plan (Version 2)

| | $t_2$ | $t_3$ | $t_4$ |
|---|---|---|---|
| Speed Setting | Reduce linearly to 25 mph | Maintain 25 mph or below | Increase linearly to 40 mph |
| Brake Type: Foundation Brake | 30 lb. of force on brake pedal | 50 lb. of force on brake pedal | No force on brake pedal |
| Brake Type: Retarder | Position 1 | Position 2 | — |
| Gear Setting | $8^{th}$ gear | $7^{th}$ gear | $9^{th}$ gear |

Although shown and described above as including three phases, in other embodiments and implementations, a descent plan can include more than three phases (e.g., four, five, six, or more phases) and/or a given phase can include multiple sub-segments, each having its own associated speed settings and brake settings, which may differ from one another in one or more respects. For example, a second phase of a descent plan can include multiple sub-segments for a non-linear downhill road segment (e.g., with one or more small plateaus associated with one or more of the multiple sub-segments).

Figure 1B:
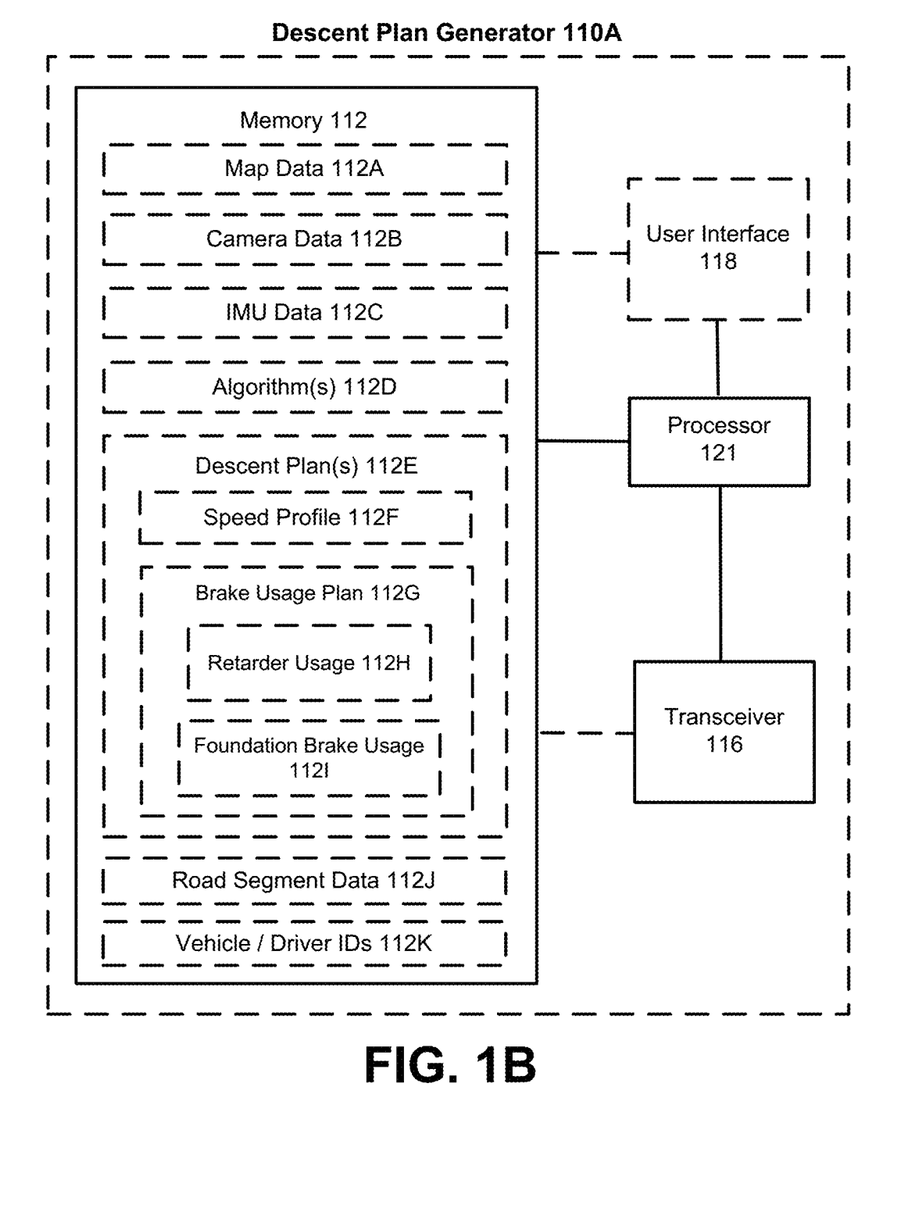
FIG. 1B is a diagram of an example descent plan generator of the autonomous vehicle of FIG. 1A.

FIG. 1B is a diagram of an example implementation of the descent plan generator 100 of the autonomous vehicle of FIG. 1A. As shown in FIG. 1B, the descent plan generator 110A includes a processor 121 operably coupled to a memory 112, a transceiver 116, and an optional user interface 118. Optionally, one or both of the transceiver 116 and the user interface 118 is also operably coupled to the memory 112. The memory 112 stores one or more of: map data 112A, camera data 112B, IMU data 112C (and/or other sensor data), algorithm(s) 112D, descent plan(s) 112E, toad segment data 112J and/or vehicle or driver identifiers (IDs) 112K. Any of the map data 112A, the camera data 112B, and the IMU data 112C can include data that is generated locally by components residing on or in ("with") the autonomous vehicle and/or data that is received at the processor 121, e.g., via the transceiver 116 in the form of a signal received from one or more remote compute devices. The optional user interface can be an electronic display that a user (e.g., a passenger, driver, system administrator, etc.) can use to view any of the data stored in the memory. For example, a driver may wish to view a descent plan for an upcoming downhill road segment, and/or to confirm that the descent plan has been timely and/or correctly generated.

Similar to the discussion above, each of the descent plan(s) 112E can include a speed profile (or "speed settings") 112F and a brake usage plan ("brake settings") 112G. The brake usage plan 112G can include an indication of a target/prescribed retarder usage 112H and an indication of a foundation brake usage 112I. The indications of the target/prescribed retarder usage 112H and of the foundation brake usage 112I can include values in absolute terms (e.g., retarder position or foundation brake position), or can include values in relative terms (e.g., 35% retarder, 65% foundation brake). The speed profile 112F and the brake usage plan 112G can be generated based on one or more of the map data 112A, the camera data 112B, the IMU data 112C, or the road segment data 112J. Alternatively or in addition, the speed profile 112F and the brake usage plan 112G can be generated using one or more of the algorithm(s) 112D. The algorithm(s) 112D can include, for example, one or more process control algorithms (e.g., MPC, discussed above) and/or one or more machine learning algorithms (e.g., deep learning, such as neural networks (e.g., convolutional neural networks (CNNs)).

In some implementations, the descent plan generator 110A is configured to perform (i.e., stores processor-executable instructions in memory to perform) sensor fusion by combing the camera data 112B and the IMU data 112C. In other implementations (not shown), the camera data 112B can be combined with other sensor data (e.g., radar and/or laser imaging, detection, and ranging (LiDAR) data) via sensor fusion, optionally with subsequent machine learning based on the fused output from all sensors. The other sensor data can be generated locally by one or more components residing on or in ("with") the autonomous vehicle and/or data that is received at the processor 121, e.g., via the transceiver 116 in the form of a signal received from one or more remote compute devices.

Figure 1C:
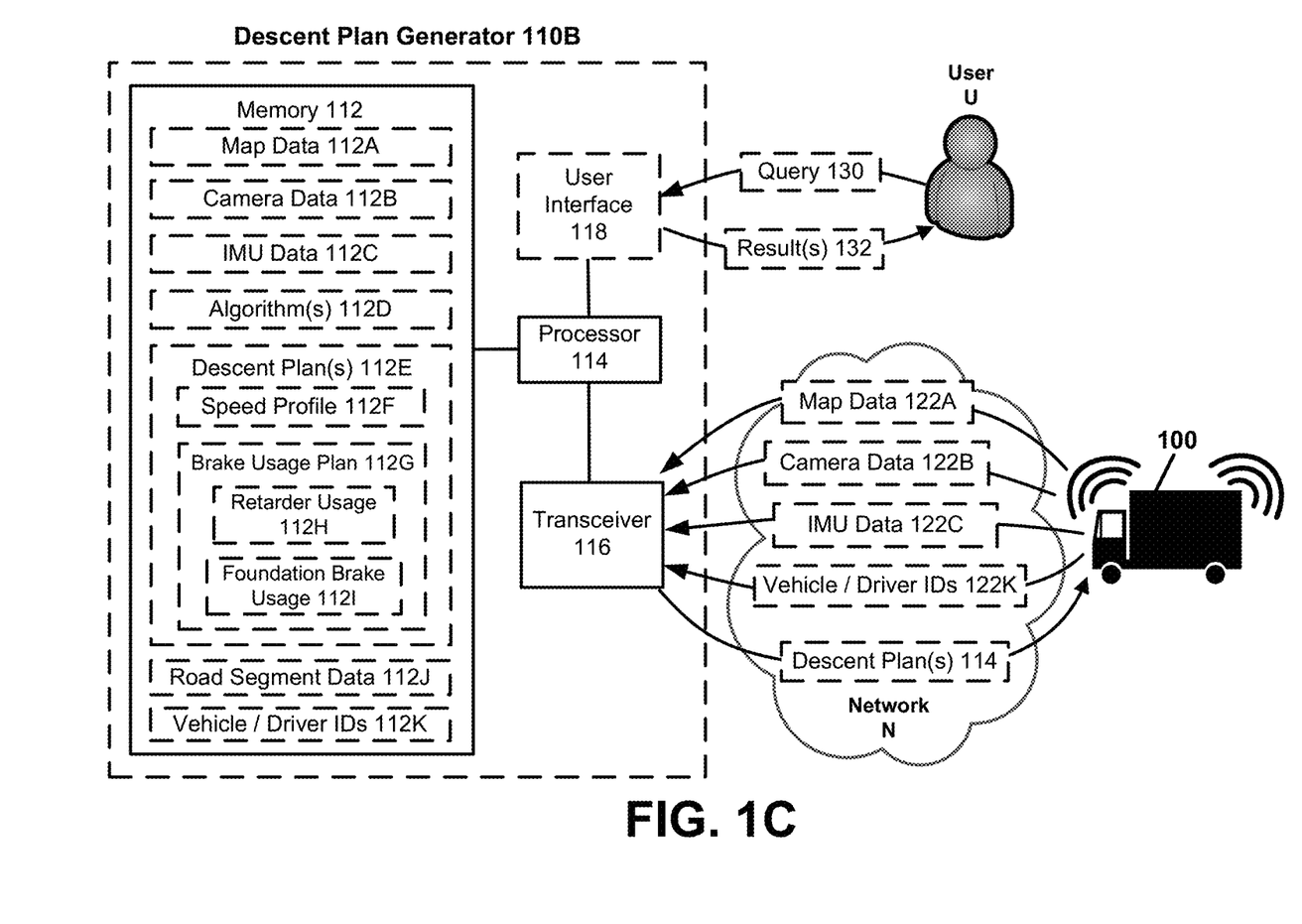
FIG. 1C is a diagram of an autonomous vehicle control system, in which a descent plan generator is remote from, and in communication with, an autonomous vehicle, according to some embodiments.

FIG. 1C is a diagram of an autonomous vehicle control system, in which the descent plan generator 110B is remote from, and in communication with, the autonomous vehicle 100, according to some embodiments. The descent plan generator 110B includes similar components and functionality to the descent plan generator 110A in FIG. 1B. As shown in FIG. 1C, the autonomous vehicle 100 optionally sends map data 112A, camera data 112B, IMU data 112C, and/or vehicle/driver IDs 112K to the descent plan generator 110B via a wireless telecommunications network "N," where that data is received via the transceiver 116. In response to receiving the map data 112A, camera data 112B, IMU data 112C, and/or vehicle/driver IDs 112K from the autonomous vehicle 100, the descent plan generator can automatically generate one or more descent plans 114 and transmit a signal back to the autonomous vehicle 100, via the network N and using the transceiver 116, the signal representing the one or more descent plans 114. The wireless telecommunications network N can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

Figure 2:
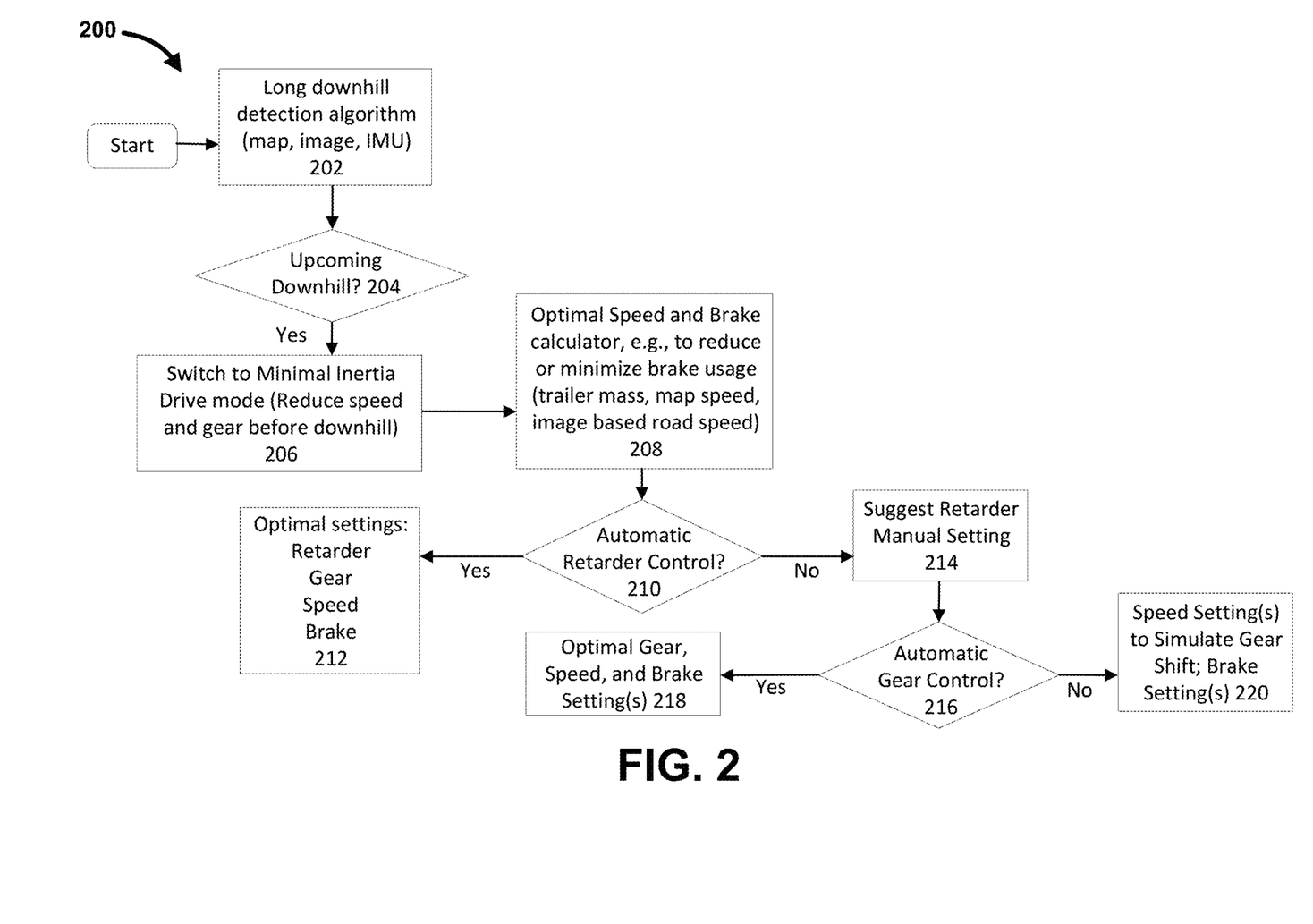
FIG. 2 is a flow diagram showing an automated speed selection and retarder application process, according to some embodiments.

FIG. 2 is a flow diagram showing an automated speed selection and retarder application process 200, according to some embodiments. The process 200 of FIG. 2 can be implemented, for example, using the descent plan generator 110A of FIG. 1B or the descent plan generator 110B of FIG. 1C. As shown in FIG. 2, the process 200 begins by executing a long downhill detection algorithm (e.g., algorithm(s) 112D of FIGS. 1B and 1C) at 202, for example based on map data, image data and/or IMU data, and a determination is made at 204 as to whether there an upcoming downhill road segment has been detected based on the execution of the long downhill detection algorithm at 202. If no upcoming downhill road segment has been detected, the process 200 terminates (or, optionally, step 202 may be repeated at a later time, e.g., according to a predefined schedule). If it is determined at 204 that an upcoming downhill road segment has been detected, a current driving mode of the autonomous vehicle is switched to a minimal inertia drive mode 206. While the autonomous vehicle is in the minimal inertia drive mode, a speed and a gear of the autonomous vehicle are adjusted prior to the autonomous vehicle reaching the detected upcoming downhill road segment. At 208, speed and brake calculations are made, with the objective of limiting or minimizing brake usage (e.g., minimizing foundation brake usage). In other implementations, the speed and brake calculations at 208 are performed with an objective of keeping brake usage to within a predefined brake usage range and/or keeping the speed(s) to within a predefined speed range. The speed and brake calculations at 208 can be based on one or more of: trailer mass, map speed (i.e., geographic location based speed limit obtained, for example, from one or maps (e.g., Google Maps®, high definition (HD) maps, etc.)), or image-based road speed. At 210, a decision is made as to whether or not to activate automatic retarder control. The decision at 210 can be based, for example, on one or more of: properties of the upcoming downhill road segment, the type(s) of retarders installed with the autonomous vehicle and the associated capabilities, or one or more user settings or preferences. If a decision is made at 210 to activate automatic retarder control, a set of optimal settings is determined at 212, specifying one or more retarder settings, one or more gear settings, one or more speed settings, and one or more brake settings (optionally in combination with an associated brake system or type), which may be automatically implemented at the autonomous vehicle. If a decision is made at 210 not to activate automatic retarder control, one or more suggestions for manual retarder settings is generated at 214 (and, optionally displayed to a user via a graphical user interface (GUI), such as the user interface 118 of FIG. 1B). At 216, a determination is made as to whether or not to activate automatic gear control. The decision at 216 can be based, for example, on one or more of: properties of the upcoming downhill road segment, whether or not the autonomous vehicle is equipped with automatic gear control capabilities, or one or more user settings or preferences. If a decision is made at 216 to activate automatic gear control, a set of optimal settings is determined at 218, specifying gear, speed, and brake settings that can be automatically implemented at the autonomous vehicle. If a decision is made at 216 not to activate automatic gear control, a speed setting is selected at 220 that simulates a desired gear shift. For example, in some implementations, if speed is reduced independently of transmission control, the transmission may automatically downshift. Thus, the speed set point can be used as a proxy to simulate transmission control when direct transmission control is not used. Also at 220, a brake setting is selected. Each of the speed setting and the brake setting may then be automatically implemented at the autonomous vehicle.

Figure 3:
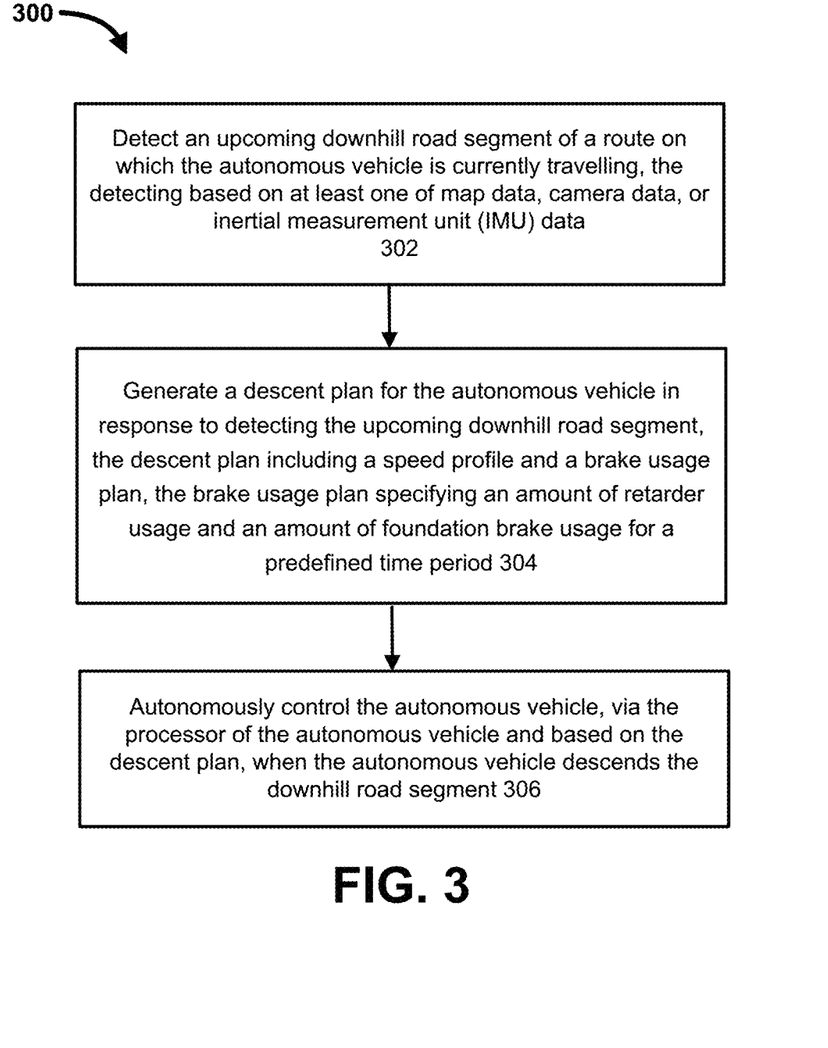
FIG. 3 is a flow diagram showing an example method for autonomously generating and implementing a descent plan, according to some embodiments.

FIG. 3 is a flow diagram showing an example method for autonomously generating and implementing a descent plan, according to some embodiments. The method 300 can be implemented, for example, using the descent plan generator 110A of FIG. 1B or the descent plan generator 110B of FIG. 1C. As shown in FIG. 3, the method 300 includes detecting, at 302 and via a processor of an autonomous vehicle, an upcoming downhill road segment of a route on which the autonomous vehicle is currently travelling. The detection is based on map data (e.g., the map data 112A of FIG. 1B or 1C), camera data (e.g., the camera data 112B of FIG. 1B or 1C), and/or inertial measurement unit (IMU) data (e.g., the IMU data 112C of FIG. 1B or 1C). In response to detecting the upcoming downhill road segment, a descent plan is generated at 304 for the autonomous vehicle (e.g., using one or more of the algorithm(s) 112D of FIG. 1B or 1C). The descent plan (e.g., the descent plan(s) 112E of FIG. 1B or 1C) includes a speed profile (e.g., the speed profile 112F of FIG. 1B or 1C) and a brake usage plan (e.g., the brake usage plan 112G of FIG. 1B or 1C). The brake usage plan specifies a non-zero amount of retarder usage (e.g., retarder usage 112H of FIG. 1B or 1C) and an amount of foundation brake usage (e.g., foundation brake usage 112I of FIG. 1B or 1C) for a predefined time period. The method also includes autonomously controlling the autonomous vehicle, at 306 and based on the descent plan, when the autonomous vehicle descends the downhill road segment.

In some implementations, the predefined time period is a time period during which the autonomous vehicle is expected to transit the downhill road segment.

In some implementations, the brake usage plan further specifies a cadence braking plan associated with the amount of foundation brake usage.

In some implementations, the brake usage plan specifies a temporal distribution of friction braking force and a temporal distribution of regenerative braking force over a predefined time period during which the autonomous vehicle is expected to transit the downhill road segment.

In some implementations, the descent plan further includes a gear usage plan.

In some implementations, generating the descent plan is based on at least one of a cargo weight of the autonomous vehicle, a length of the downhill road segment, a grade of the downhill road segment, a condition of the downhill road segment, or weather.

In some implementations, generating the descent plan is based on at least one of a brake usage history or a brake temperature history of the autonomous vehicle.

Figure 4:
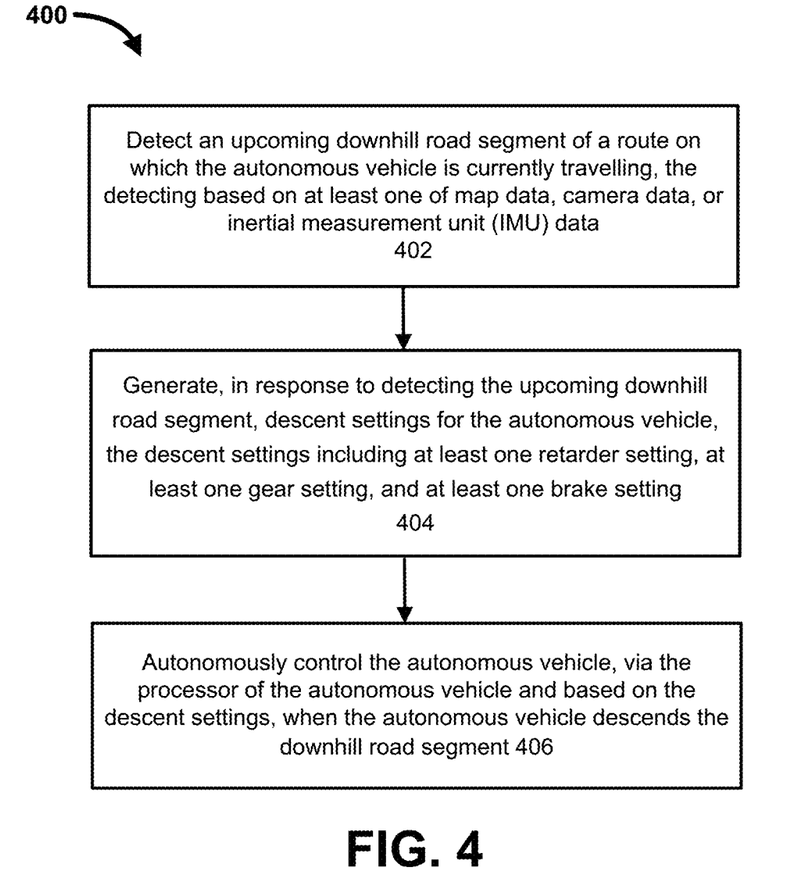
FIG. 4 is a flow diagram showing an example method for autonomously generating and implementing descent settings, with automatic retarder control, according to some embodiments.

FIG. 4 is a flow diagram showing an example method for autonomously generating and implementing descent settings, with automatic retarder control, according to some embodiments. The method 400 can be implemented, for example, using the descent plan generator 110A of FIG. 1B or the descent plan generator 110B of FIG. 1C. As shown in FIG. 4, the method 400 includes detecting, at 402 and via a processor of an autonomous vehicle, an upcoming downhill road segment of a route on which the autonomous vehicle is currently travelling. The detecting can be based on at least one of map data (e.g., map data 112A of FIG. 1B or 1C), camera data (e.g., camera data 112B of FIG. 1B or 1C), or inertial measurement unit (IMU) data (e.g., IMU data 112C of FIG. 1B or 1C), or any combination thereof. At 404, the method also includes generating, via the processor of the autonomous vehicle and in response to detecting the upcoming downhill road segment, descent settings for the autonomous vehicle. The descent settings may collectively form a descent plan for the autonomous vehicle (e.g., descent plan(s) 112E of FIG. 1B or 1C). The descent settings can include at least one retarder setting, at least one gear setting, and at least one brake setting, or any sub-combination thereof. In some implementations, the at least one retarder setting represents a non-zero amount of braking power (i.e., the at least one retarder setting does not include an "OFF" setting). The method also includes autonomously controlling the autonomous vehicle, at 406, via the processor of the autonomous vehicle and based on the descent settings, when the autonomous vehicle descends the downhill road segment.

In some implementations, the at least one brake setting specifies a non-zero amount of retarder usage and an amount of foundation brake usage.

In some implementations, the at least one brake setting specifies an amount of friction braking force and an amount of regenerative braking force.

In some implementations, the descent settings are associated with a projected time period during which the autonomous vehicle is expected to transit the downhill road segment.

In some implementations, the generating the descent settings is based on at least one of a brake usage history or a brake temperature history of the autonomous vehicle.

In some implementations, the generating the descent settings is based on at least one of a cargo weight of the autonomous vehicle, a length of the downhill road segment, a grade of the downhill road segment, a condition of the downhill road segment, or weather.

Figure 5:
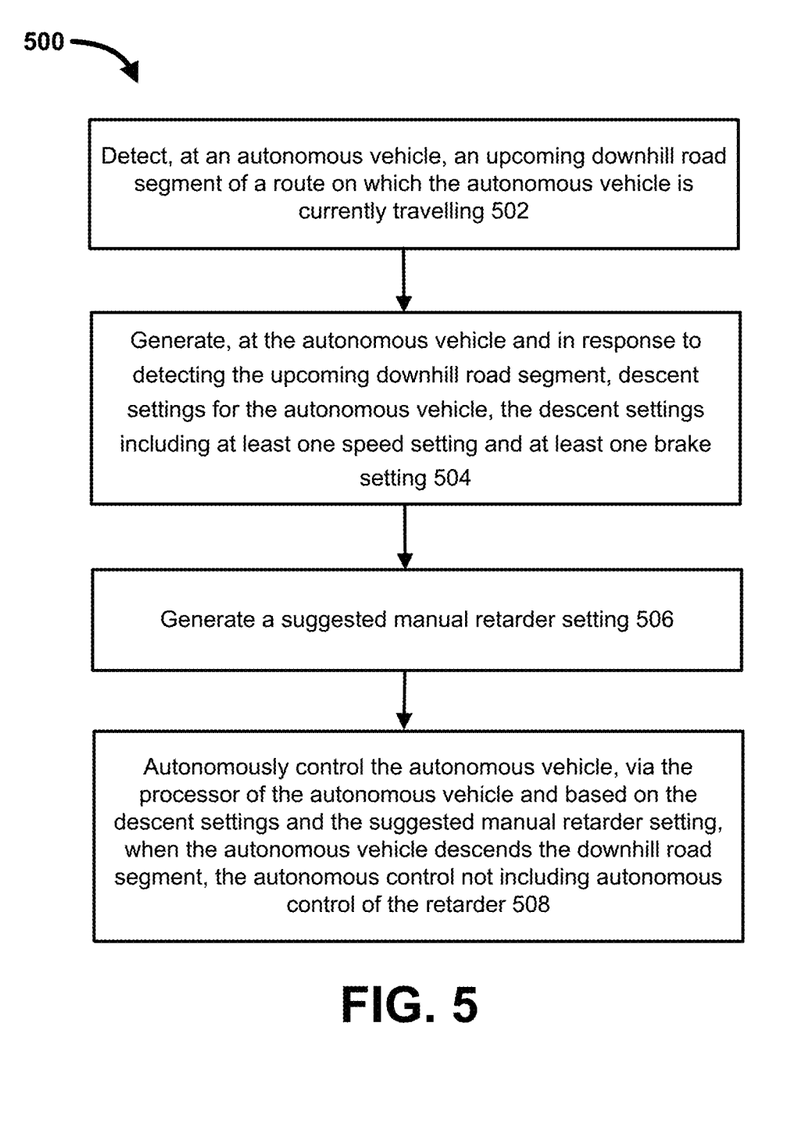
FIG. 5 is a flow diagram showing an example method for autonomously generating and implementing descent settings, without automatic retarder control, according to some embodiments.

FIG. 5 is a flow diagram showing an example method 500 for autonomously generating and implementing descent settings, without automatic retarder control, according to some embodiments. The method 500 can be implemented, for example, using the descent plan generator 110A of FIG. 1B or the descent plan generator 110B of FIG. 1C. As shown in FIG. 5, the method 500 includes detecting, at 502 and at an autonomous vehicle, an upcoming downhill road segment of a route on which the autonomous vehicle is currently travelling. The method 500 also includes generating, at 504, at the autonomous vehicle and in response to detecting the upcoming downhill road segment, descent settings for the autonomous vehicle. The descent settings may collectively form a descent plan for the autonomous vehicle (e.g., descent plan(s) 112E of FIG. 1B or 1C). The descent settings can include at least one speed setting and/or at least one brake setting. The at least one speed setting can represent a speed profile (e.g., speed profile 112F of FIG. 1B or 1C). The at least one brake setting can be part of a brake usage plan (e.g., brake usage plan 112G of FIG. 1B or 1C). The method 500 also includes generating, at 506, a suggested manual retarder setting, and autonomously controlling the autonomous vehicle, at 508, via the processor of the autonomous vehicle and based on the descent settings and the suggested manual retarder setting, while the autonomous vehicle descends the downhill road segment, the autonomous control not including autonomous control of the retarder.

In some implementations, the autonomously controlling the autonomous vehicle is further based on an automatic gear control.

In some implementations, the detecting the upcoming downhill road segment is based on at least one of map data (e.g., map data 112A of FIG. 1B or 1C), camera data (e.g., camera data 112B of FIG. 1B or 1C), or inertial measurement unit (IMU) data (e.g., IMU data 112C of FIG. 1B or 1C).

In some implementations, the at least one brake setting specifies an amount of foundation brake usage and a cadence braking plan associated with the foundation brake usage.

In some implementations, the generating the descent settings is based on at least one of a cargo weight of the autonomous vehicle, a length of the downhill road segment, a grade of the downhill road segment, a condition of the downhill road segment, or weather.

In some implementations, the generating the suggested manual retarder setting is based on at least one of a cargo weight of the autonomous vehicle, a length of the downhill road segment, a grade of the downhill road segment, a condition of the downhill road segment, or weather.

In some implementations, at least one of the generating the descent settings or the generating the suggested manual retarder setting is based on at least one of a brake usage history or a brake temperature history of the autonomous vehicle.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

As used herein, "substantially concurrently" can refer to events that take place at the same time when adjusted for processing-related delays (e.g., computation delay, transmission delay, etc.), or can refer to events that overlap in time.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system comprising: a processor; and a memory operably coupled to the processor, the memory storing instructions that when executed cause the processor to perform operations comprising: detecting an upcoming downhill road segment for a vehicle based on at least one of: map data, camera data, or inertial measurement unit (IMU) data; before the vehicle reaches the downhill road segment, controlling at least one of: a speed, a brake, or a gear of the vehicle to satisfy a speed setting for approaching the downhill road segment; generating a descent plan for control of the vehicle while the vehicle travels the downhill road segment, wherein the descent plan includes a speed profile and a brake usage plan, the brake usage plan specifies a non-zero amount of retarder usage and an amount of foundation brake usage for a predefined time period; and while the vehicle travels the downhill road segment, controlling the vehicle, based on the descent plan.

2. The system of claim 1, wherein the predefined time period is based on an expected time for the vehicle to travel the downhill road segment.

3. The system of claim 1, wherein the brake usage plan further specifies a cadence braking plan that includes alternation between application and removal of foundation brakes based on a predefined schedule.

4. The system of claim 1, wherein the brake usage plan specifies a temporal distribution of friction braking force or a temporal distribution of regenerative braking force to be applied while the vehicle travels the downhill road segment.

5. The system of claim 1, wherein the descent plan includes a gear usage plan.

6. The system of claim 1, wherein the generating the descent plan is based on at least one of: a cargo weight of the vehicle, a length of the downhill road segment, a grade of the downhill road segment, a condition of the downhill road segment, a brake usage history of the vehicle, a brake temperature history of the vehicle, or a weather condition.

7. The system of claim 1, wherein the descent plan includes a lighting plan that specifies a duration for activation of hazard lights.

8. A computer-implemented method, comprising: detecting, by a computing system, an upcoming downhill road segment for a vehicle based on at least one of: map data, camera data, or inertial measurement unit (IMU) data; before the vehicle reaches the downhill road segment, controlling, by the computing system, at least one of: a speed, a brake, or a gear of the vehicle to satisfy a speed setting for approaching the downhill road segment; generating, by the computing system, a descent plan for control of the vehicle while the vehicle travels the downhill road segment, wherein the descent plan includes a speed profile and a brake usage plan, the brake usage plan specifies a non-zero amount of retarder usage and an amount of foundation brake usage for a predefined time period; and while the vehicle travels the downhill road segment, controlling, by the computing system, the vehicle based on the descent plan.

9. The computer-implemented method of claim 8, wherein the predefined time period is based on an expected time for the vehicle to travel the downhill road segment.

10. The computer-implemented method of claim 8, wherein the brake usage plan specifies a cadence braking plan that includes alternation between application and removal of foundation brakes based on a predefined schedule.

11. The computer-implemented method of claim 8, wherein the brake usage plan specifies a temporal distribution of friction braking force or a temporal distribution of regenerative braking force to be applied while the vehicle travels the downhill road segment.

12. The computer-implemented method of claim 8, wherein the descent plan includes a gear usage plan.

13. The computer-implemented method of claim 8, wherein the generating the descent settings is based on at least one of a cargo weight of the vehicle, a length of the downhill road segment, a grade of the downhill road segment, a condition of the downhill road segment, a brake usage history of the vehicle, a brake temperature history of the vehicle, or a weather condition.

14. A non-transitory, computer-readable storage medium including instructions that, when executed by at least one processor of a computing system, cause the computing system to perform operations comprising: detecting an upcoming downhill road segment for a vehicle based on at least one of: map data, camera data, or inertial measurement unit (IMU) data; before the vehicle reaches the downhill road segment, controlling at least one of: a speed, a brake, or a gear of the vehicle to satisfy a speed setting for approaching the downhill road segment; generating a descent plan for control of the vehicle while the vehicle travels the downhill road segment, wherein the descent plan includes a speed profile and a brake usage plan, the brake usage plan specifies a non-zero amount of retarder usage and an amount of foundation brake usage for a predefined time period; while the vehicle travels the downhill road segment, controlling the vehicle based on the descent plan.

15. The non-transitory, computer-readable storage medium of claim 14, wherein the predefined time period is based on an expected time for the vehicle to travel the downhill road segment.

16. The non-transitory, computer-readable storage medium of claim 14, wherein the brake usage plan specifies a cadence braking plan that includes alternation between application and removal of foundation brakes based on a predefined schedule.

17. The non-transitory, computer-readable storage medium of claim 14, wherein the brake usage plan specifies a temporal distribution of friction braking force or a temporal distribution of regenerative braking force to be applied while the vehicle travels the downhill road segment.

18. The non-transitory, computer-readable storage medium of claim 14, wherein the descent plan includes a gear usage plan.

19. The non-transitory, computer-readable storage medium of claim 14, wherein the generating the descent plan is based on at least one of: a cargo weight of the vehicle, a length of the downhill road segment, a grade of the downhill road segment, a condition of the downhill road segment, a brake usage history of the vehicle, a brake temperature history of the vehicle, or a weather condition.

20. The non-transitory, computer-readable storage medium of claim 14, wherein the descent plan includes a lighting plan that specifies a duration for activation of hazard lights.

* * * * *